United States Patent
Oroskar et al.

(10) Patent No.: US 10,070,351 B1
(45) Date of Patent: Sep. 4, 2018

(54) METHOD AND SYSTEM FOR ASSIGNING A CONTENTION-FREE ACCESS RESOURCE

(71) Applicant: Sprint Spectrum L.P., Overland Park, KS (US)

(72) Inventors: Siddharth S. Oroskar, Overland Park, KS (US); Maulik K. Shah, Overland Park, KS (US); Jasinder P. Singh, Olathe, KS (US); John W. Prock, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 813 days.

(21) Appl. No.: 14/074,389

(22) Filed: Nov. 7, 2013

(51) Int. Cl.
*H04W 36/00* (2009.01)

(52) U.S. Cl.
CPC .............................. *H04W 36/0072* (2013.01)

(58) Field of Classification Search
None
See application file for complete search history.

(56) References Cited

U.S. PATENT DOCUMENTS

| | | | |
|---|---|---|---|
| 2012/0002545 A1* | 1/2012 | Watfa et al. | 370/235 |
| 2012/0302240 A1* | 11/2012 | Tamaki et al. | 455/436 |
| 2013/0003648 A1 | 1/2013 | Hahn et al. | |

OTHER PUBLICATIONS

Qualcomm, Circuit Switched Fallback. The First Phase of voice evolution for mobile LTE devices. White Paper, 2012, pp. 1-11.*

* cited by examiner

*Primary Examiner* — Kent Krueger

(57) ABSTRACT

A method and system to assign a contention-free access resource is disclosed. A first network may be configured to serve user equipment devices (UEs) according to a first protocol and a second network may be configured to serve UEs according to a second protocol. The method involves the first network detecting an attempt to set up a circuit-switched-fallback (CSFB) call between (i) a UE served by the first network and (ii) a remote party, where the CSFB call is to be served by the second network to which the UE would transition to be served with the CSFB call. The method further involves, in response to detecting the attempt to set up the CSFB call, the first network assigning a contention-free access resource to the UE, so as to allow a contention-free access request by the UE to the first network.

10 Claims, 7 Drawing Sheets

METHOD AND SYSTEM FOR ASSIGNING A CONTENTION-FREE ACCESS RESOURCE

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of WCDs, initiation of communications, handoff between coverage areas, and functions related to air interface communication.

In accordance with the air interface protocol, each coverage area may operate on one or more carrier frequencies or "carriers." More particularly, the base station that radiates to define a given coverage area may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service on one or more carrier frequencies with each supported band. In a frequency division duplex (FDD) arrangement, different carrier frequencies are used for the downlink than the uplink. Whereas, in a time division duplex (TDD) arrangement, the same carrier frequency is used for the downlink and uplink and is allocated over time among downlink and uplink communications.

On each carrier frequency in a coverage area, the coverage area may also define a number of air interface channels for carrying information between the base station and the WCDs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that WCDs may detect as an indication of coverage and may measure to evaluate coverage strength. As another example, each coverage area may define an uplink control channel or other resource on which WCDs may transmit control messages such as registration requests and access requests to the base station. And each coverage area may define a downlink control channel or other resource on which the base station may transmit control messages such as system information messages and page messages to WCDs. Each coverage area may then define one or more traffic channels or other resources for carrying communication traffic such as voice data and other data between the base station and WCDs.

When a WCD first powers on or enters into coverage of the network, the WCD may scan for and identify a strongest pilot or reference signal and may register with the network by transmitting a registration request or attach request to a base station providing that signal. This registration process may serve to notify the network of the WCD's presence in a particular coverage area and to facilitate network authentication of the WCD. Once registered, the WCD may then operate in an idle mode in which the WCD monitors a downlink control channel to receive overhead information and to check for any page messages. In the idle mode, the WCD may have no assigned traffic channel resources on which to engage in bearer communication.

When the network has a communication (such as a voice call or other traffic) to provide to a WCD that is registered with the network but is operating in the idle mode, the network may page the WCD in an effort to then facilitate assigning traffic channel resources to the WCD. In particular, the network may transmit on the downlink a page message addressed to the WCD. Assuming the WCD receives this page message, the WCD may then transmit to the network a page response message on the uplink. And upon receipt of the page response message, the network may then assign traffic channel resources to the WCD, for use to carry the communication, thus transitioning the WCD to a connected or active mode in which the WCD can engage in the communication.

Likewise, when an idle WCD seeks to initiate a communication (such as to place a voice call or engage in other bearer communication), the WCD may transmit on the uplink to the base station an origination or connection request, and the network may then assign traffic channel resources to the WCD for use to carry the communication, similarly transitioning the WCD to a connected or active mode in which the WCD can engage in the communication.

Overview

A method and system for assigning a contention-free access resource in response to detecting an attempt to set up a fallback communication is disclosed. An example method is operable in a communication system comprising a first network configured to serve user equipment devices (UEs) according to a first air interface protocol and a second network configured to serve UEs according to a second air interface protocol. The first network has a set of access resources usable by UEs to request access to the first network, and the set of access resources comprises contention-free access resources and non-contention-free access resources. For each contention-free access resource, the first network limits assignment of the contention-free access resource to a single UE at a time, so as to allow the single UE contention-free use of the contention-free access resource when the contention-free access resource is assigned to the single UE. The method involves the first network detecting an attempt to set up a circuit-switched-fallback (CSFB) call between (i) a UE served by the first network and (ii) a remote party, where the CSFB call is to be served by the second network to which the UE would transition to be served with the CSFB call. The method further involves, in response to detecting the attempt to set up the CSFB call, the first network assigning one of the contention-free access resources to the UE, so as to allow a contention-free access request by the UE to the first network.

In another example, the method is operable in a communication system comprising a first network configured to serve UEs according to a first air interface protocol and a second network configured to serve UEs according to a second air interface protocol. The first network has a set of access resources usable by UEs to request access to the first network, and the set of access resources comprises contention-free access resources and non-contention-free access resources. For each contention-free access resource, the first network limits assignment of the contention-free access resource to a single UE at a time, so as to allow the single UE contention-free use of the contention-free access resource when the contention-free access resource is assigned to the single UE. The method involves a UE engaging in CSFB call-setup signaling with the second network, via the first network, to set up a CSFB call. Further, the method involves the UE transitioning to be served by the second network so as to either accept the CSFB call or reject the CSFB call. Still further, the method involves, in response to the UE engaging in the CFSB call-setup signaling, the first network assigning one of the contention-free access resources to the UE, so as to allow the UE to readily re-access the first network in the event the UE rejects the CSFB call.

In another example, the method is operable in a communication system comprising a first network configured to serve UEs according to a first air interface protocol and a second network configured to serve UEs according to a second air interface protocol. The first network has a set of access resources for serving UEs accessing the first network, and the set of access resources comprises contention-free access resources and non-contention-free access resources. The method involves a UE engaging in CSFB call-setup signaling with the second network, via the first network, to set up a CSFB call. Further, the method involves the UE transitioning from being served by the first network to being served by the second network, so as to continue to set up the CSFB call. Still further, the method involves, before completing setup of the CSFB call, the UE (i) receiving an assignment of one of the contention-free access resources from the first network and (ii) receiving a user command to reject the CSFB call. Yet still further, the method involves, in response to receiving the user command to reject the CSFB call, the UE (i) rejecting the CSFB call and (ii) sending to the first network an access request that uses the assigned contention-free access resource, so as to transition back to being served by the first network.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
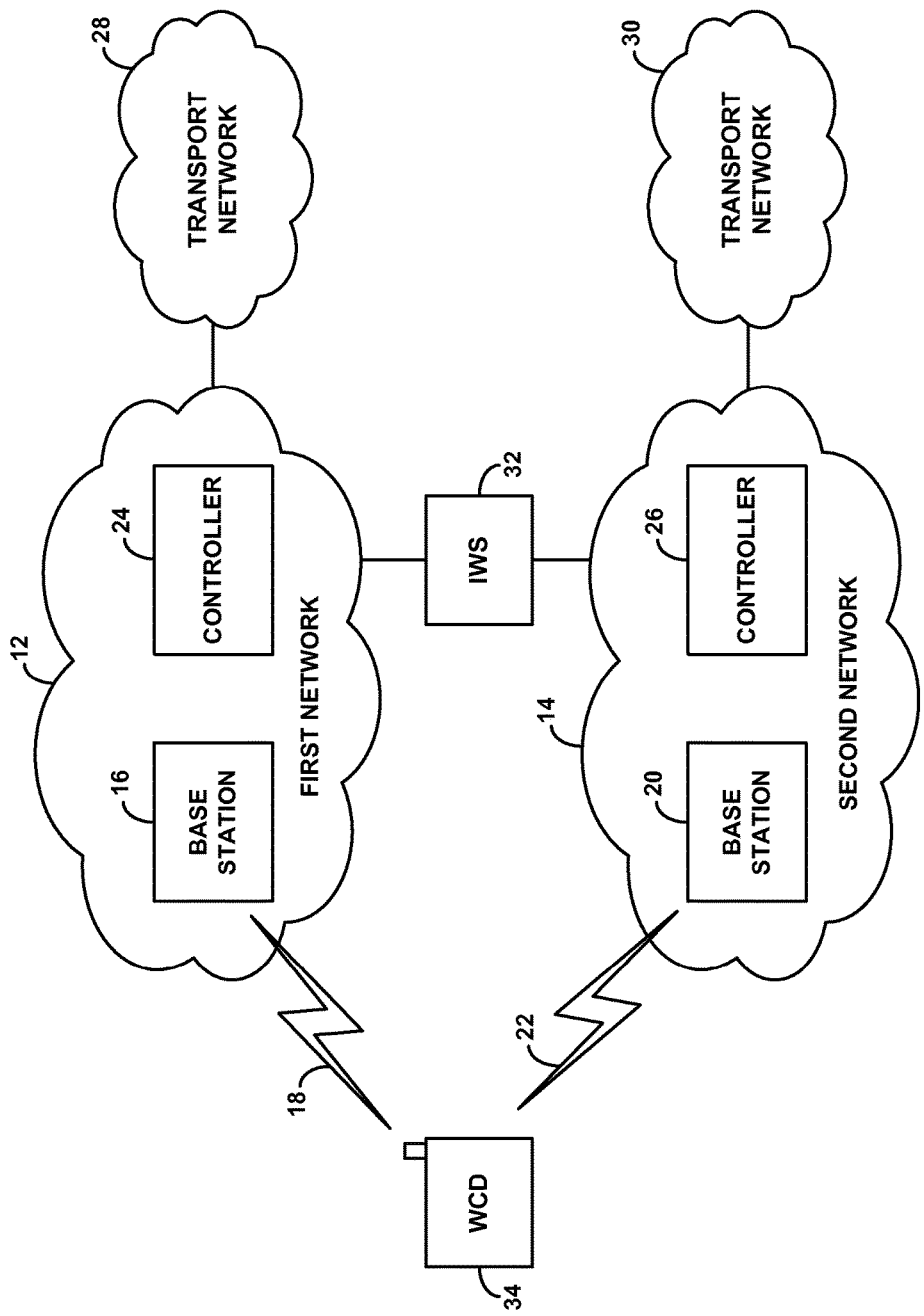
FIG. 1 is a simplified block diagram of a network arrangement in which an exemplary embodiment of the present method and apparatus can be implemented.

1. Overview of an Example Method and System

In systems that provide service under more than one air interface protocol, service providers may implement functionality that allows WCDs to operate by default on one air interface protocol and to dynamically switch over to operate on another air interface protocol when necessary to engage in certain communications. By way of example, in a system that supports both LTE service for mobile broadband and an older protocol such as CDMA or GSM for traditional voice calls, service providers may implement "circuit switched fallback" (CSFB) functionality, which allows WCDs to operate by default on LTE and to switch over to operate on CDMA or GSM to engage in voice calls. This CSFB functionality may, for example, include standard CSFB functionality and/or enhanced circuit switched fallback (eCSFB) functionality.

When CSFB functionality is implemented, for instance, a hybrid CDMA/LTE WCD may be arranged by default to scan for and register with an LTE network and to operate with its CDMA radio powered off, but to then engage in control signaling with the CDMA network via the LTE network, i.e., over the LTE air interface. To facilitate this, when the WCD registers with the LTE network, LTE network infrastructure such as a mobility management entity (MME) may signal through an interworking server (IWS) with the CDMA network to register the WCD with the CDMA network as well.

In turn, when the CDMA network has a voice call to connect to the WCD, the CDMA network may signal through the IWS to the LTE network to cause the LTE network to transmit a CSFB page message to the WCD over the LTE air interface. After further CSFB signaling through the LTE network, the WCD may then power on its CDMA radio and tune to the CDMA network to engage in the call over the CDMA air interface.

In one implementation of this process, for instance, once the WCD receives the CSFB page message for the incoming CSFB call, the WCD may transmit a CSFB extended service request message to its serving LTE base station as a request to set up the incoming CSFB call. In turn, the LTE base station may then send to the WCD a list of CDMA carriers on which the local CDMA network provides service. And the WCD may use its CDMA radio to scan for coverage on each of the listed CDMA carriers and transmit to the LTE base station a report of the strongest CDMA pilot signals and corresponding signal strengths that the WCD detected. The LTE network may then pass those pilot signal measurements via the IWS to the CDMA network, and the CDMA network may use those measurements as a basis to determine a CDMA coverage area and traffic channel to assign to the WCD. The CDMA network may then transmit a handover direction message via the IWS to the LTE network, which the LTE network may transmit to the WCD, directing the WCD to transition to CDMA to communicate in the assigned CDMA coverage area and traffic channel. The WCD may then use its CDMA radio to tune to the assigned channel and to engage in the call via CDMA.

Likewise, when the WCD is served by the LTE network and has a voice call to place, the WCD may transmit over the LTE air interface to its serving LTE base station a CSFB extended service request message to request setup of an outgoing CSFB call, and the LTE base station may similarly send to the WCD a list of CDMA carriers on which the local CDMA network provides service. The WCD may then similarly tune to CDMA and scan for coverage on each of the listed CDMA carriers, and report the strongest detected CDMA pilots to the LTE base station. And the CDMA network may similarly determine a CDMA coverage area and traffic channel to assign to the WCD and transmit a handover direction message via the IWS to the LTE network for transmission to the WCD. The WCD may then similarly use its CDMA radio to tune to the assigned channel and to engage in the call via CDMA. This CSFB call setup process allows the WCD to engage in CDMA voice call setup through its existing LTE connection, without the need for the WCD to be idling in CDMA coverage in the first place.

In practice, after transferring to the CDMA network for the CSFB call, the UE may at some point transfer back to the LTE network. For example, the UE may complete the CFSB call and subsequently transfer back to the LTE network. In another example, the UE may reject the CSFB call and subsequently transfer back to the LTE network. Typically, in order to transfer back to the LTE network, the UE would need to reselect the LTE network (e.g., through better system reselection (BSR) or cell reselection) and follow standard procedures to reconnect to the LTE network. This reconnection process may involve, for instance, using an access resource for sending an access request to the LTE network.

In a common example, the LTE network may have a set of access resources usable by UEs to request access to the first network and these access resources would typically be non-contention-free access resources. UEs may use these non-contention-free access resources to attempt to access the LTE network. Each non-contention-free access resource may be available to multiple UEs at a same time, and this availability may allow multiple UEs to attempt to use the non-contention-free access resource at the same time. In an example, a first UE may select (e.g., randomly select) one of the non-contention-free access resources from among the set of non-contention-free access resources, and the UE may then use that selected non-contention-free access resource for an access attempt. For instance, in practice, under LTE there are typically 64 preamble signatures available and the first UE may randomly select one of the preamble signatures for use in an access attempt. Unfortunately, at the same time, one or more other UEs may also randomly select the same non-contention-free access resource and may use that selected non-contention-free access resource for an access attempt. As a result, multiple UEs may be attempting to use the same non-contention-free access resource at the same time, and this may cause delay in accessing the LTE network for one or more of the UEs. Continuing the example discussed above, the one or more UEs may select the same preamble signature that the first UE selected. If each of the UEs then sends at the same time an access request using the same preamble, there can be a preamble collision. Such a preamble collision may result in a delay in connecting to the LTE network for the UEs.

Typically in a fallback-communication situation such as CSFB, the access resources available to UEs for use in transitioning back to the LTE network after completing the fallback communication would be non-contention-free access resources. Unfortunately, a problem with using non-contention-free access resources in a fallback-communication situation is that, for one reason or another, a user may not wish to engage in the CSFB call and the user may instead wish to continue being served by the LTE network. In an example, the UE may not receive caller-ID information until the UE is actually within coverage of the CDMA network, and there is a chance that a user of the UE may reject the CSFB call once the UE is actually within coverage of the CDMA network. In such a case, the UE may thus transition from being served by the CDMA network back to being served by the LTE network without completing setup of or engaging in the CSFB call. However, if the UE uses a non-contention-free access resource, use of the non-contention-free access resource may delay the transition back to the LTE network for the UE. This delay may pose problems, for example, during a wireless packet data communication service such as video streaming or other LTE applications.

The disclosed method and system offers an improved way to handle access-resource assignment in a fallback-communication situation such as a CSFB call. In particular, the disclosed method may involve assigning, in response to detecting an attempt to set up a fallback communication, a contention-free access resource to a UE. Further, in an example embodiment, the method may involve making that contention-free access resource available to the UE for a limited period of time.

In accordance with the disclosure, a first network (e.g., an LTE network) may be serving a UE, and the first network may detect an attempt to set up a CSFB call between (i) the UE served by the first network and (ii) a remote party, where the CSFB call is to be served by a fallback network (e.g., a CDMA network) to which the UE would transition to be served with the CSFB call. In response to detecting the attempt to set up the CSFB call, the first network may assign a contention-free access resource to the UE. This disclosed process may help the UE quickly return to the LTE network in the event that the user cancels or ignores the CSFB call. In particular, the assignment of the contention-free access resource to the UE may allow the UE to make a contention-free access request. Further, the contention-free access request may make the transition back to the LTE network fairly seamless. In particular, such a contention-free access request may help the UE quickly return to the LTE network without the risk of access-resource contention or collision. Beneficially, a UE making a contention-free access request may be able to return to the LTE network more quickly than a UE making a non-contention-free access request.

2. Example Communication System Architecture

As noted above, FIG. 1 is a simplified block diagram of a network arrangement in which an exemplary embodiment of the present method and system can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

The arrangement of FIG. 1 includes by way of example two representative access networks 12, 14, each of which may function to provide WCDs with air interface coverage and connectivity with one or more transport networks such as the PSTN and the Internet. As such, each of these networks may include multiple base stations that radiate to provide one or more respective coverage areas defining an air interface in which to exchange control and bearer data with WCDs. For simplicity in the arrangement shown, for instance, network 12 includes a representative base station 16 that radiates to provide a coverage area 18, and network 14 includes a representative base station 20 that radiates to provide a coverage area 22. As discussed above, each such coverage area may operate on one or more carriers.

Each network may then further include various network infrastructure to support setup of connections and communications and/or to provide connectivity with transport networks. This network infrastructure may take various forms and include any of a variety of network elements, including for instance a controller of one form or another. For instance, in the arrangement shown, network 12 includes a respective controller 24, and network 14 includes a respective controller 26. Network 12 is then shown providing connectivity with a representative transport network 28, and network 14 is shown providing connectivity with a representative transport network 30. In an example implementation, transport network 28 might be the Internet, and transport network 30 might be the PSTN.

As further shown in the figure, an IWS 32 is provided for passing signaling between the first network and the second network. In practice, the IWS may be provided as a function or element of one of the networks in particular. For instance, the IWS may be provided as a function of controller 26 in network 14. IWS may operate to pass signaling between the controllers 24, 26 and/or other elements of the networks. For instance, in the context of the present disclosure, the IWS may function to pass CSFB call setup messages or similar setup messages between the networks.

Network 12 and network 14, and IWS 32 may be owned and operated by a common wireless service provider, and the service provider may configure the networks to interwork with each other (or may arrange for the IWS to associate the networks with each other) so as to facilitate CSFB for instance. Alternatively, the networks may be owned and/or operated by separate wireless service providers, and those service providers may have an agreement with each other to allow for interworking between the networks, again to facilitate CSFB or the like.

With the arrangement shown in FIG. 1, a WCD 34 is shown positioned in coverage of both network 12 and network 14. When such a WCD first powers on or arrives in coverage of network 12, the WCD may scan for and detect coverage provided by network 12 and may responsively register with network 12 by transmitting in coverage area 18 to base station 16 a registration request. In response, network 12 (e.g., controller 24) may then record the fact that WCD 34 is present within coverage area 18 served by base station 16, so as to facilitate paging WCD 34 for calls or other incoming communications. Further, given the association between network 12 and network 14, network 12 may also responsively signal to IWS 32 to trigger registration of WCD 34 with network 14. WCD 34 may then idle in coverage area 18 of network 12.

When network 14 has a call or other communication to connect or otherwise provide to WCD 34, network 14 may then send a page message (or page message trigger) to IWS 32, which IWS 32 may pass along to network 12 to trigger paging of the WCD via network 12. Network 12 may then responsively page the WCD by having base station 16 transmit a CSFB page message to the WCD in coverage area 18. In line with the example CSFB procedures described above, once the WCD responds to this CSFB page, the WCD may then send a CSFB extended service request message to base station 16 to request setup of the CSFB communication. And likewise, when the WCD seeks to place a CSFB call, the WCD may establish connectivity with base station 16 and may send a CSFB extended service request message to base station 16 to request setup of that CSFB communication.

In either case, base station 16 may then transmit to the WCD a list of carriers of the second network 14 for the WCD to scan in search of coverage in which to engage in the communication. In practice, for instance, given the example association between these networks, base station 16 may be provisioned to provide as the list of carriers those on which base stations of network 14 operate. The WCD may then scan those carriers of network 14 in search of coverage and may report one or more strongest detected pilots in a measurement report to base station 16 of network 12.

Network 12 may then forward to the IWS 32 a representation of the WCD's measurement report, which IWS 32 may in turn provide to an element of network 14, such as controller 26. With that information, network 14 may then select an appropriate coverage area and traffic channel on which to have the WCD engage in the communication. And the network 14 may return to IWS 32 a handover direction message directing the WCD take transition to that coverage area and channel to engage in the communication. IWS 32 may then pass that handover direction message to network 12, and base station 16 may transmit the message in coverage area 18 to the WCD. The WCD may then transition to be served by the indicated coverage area and channel of network 14. After the WCD transitions to the network 14, the WCD may then complete setup of the CSFB call so as to engage in the communication. In another example, after the WCD transitions to the network 14, call setup may fail for one reason or another (e.g., the user rejecting or canceling the CSFB call), and the WCD may then transition back to network 12.

Figure 2:
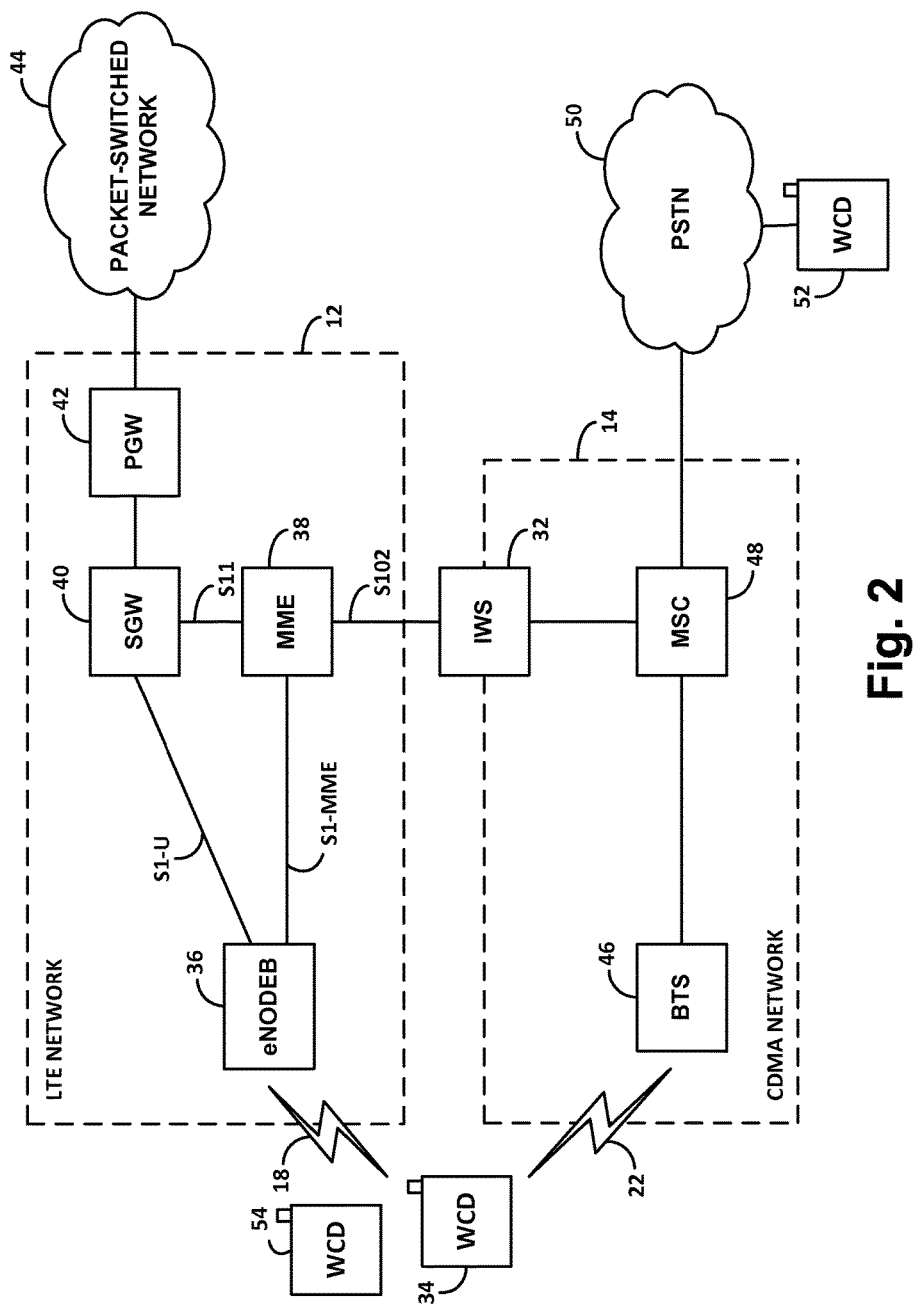
FIG. 2 is a simplified block diagram of a more specific network arrangement in which the exemplary embodiment can be implemented.

FIG. 2 is next a more specific block diagram depicting an example implementation of the network arrangement shown in FIG. 1. In the arrangement of FIG. 2, network 12 is an LTE network that primarily serves WCDs with wireless packet data communication service (including perhaps voice-over-packet and other packet-based real-time media service), and network 14 is a CDMA network that primarily serves WCDs with circuit-switched voice call service (but may also provide packet-data communication service and other types of service). These networks could take other forms as well, using other protocols such as WiMAX, GSM, or others now known or later developed.

The LTE network 12 in this arrangement is shown including a representative LTE base station 36 known as an eNodeB, which includes an antenna structure and associated equipment for engaging in LTE communication over the air interface of coverage area 18 with WCDs. The eNodeB 36 is then shown coupled with an MME 38 that serves as controller 24 and particularly as a signaling controller for the LTE network. Further, the eNodeB 36 is also shown coupled with a serving gateway (SGW) 40, which may then be coupled with a packet-gateway (PGW) 42 that connects with a packet-switched network 44. And the MME 38 is shown coupled with the SGW 40. Although the elements of the LTE network 12 are shown with direct connections between them, in a likely arrangement, the elements may sit as nodes on a core packet network, and thus the illustrated connections may be logical interfaces between the elements over that network.

The CDMA network 14, on the other hand, is shown including a representative CDMA base station 46 known as a base transceiver station (BTS), which includes an antenna structure and associated equipment for engaging in CDMA communication over the air interface of coverage area 22 with WCDs. The BTS 46 is then shown in communication (possibly through a base station controller (BSC) or radio network controller (RNC) (not shown)) with a mobile switching center (MSC) 48 that serves as controller 26 to manage paging over the CDMA air interface and that provides connectivity with the PSTN 50. Further shown in FIG. 2 is then the IWS 32, which functions to facilitate interworking between the LTE network 12 and the CDMA network 14 as discussed above, so as to facilitate CSFB functionality for instance.

In practice with this LTE/CDMA arrangement, the LTE eNodeB 36 may broadcast an overhead signal such as a System Information Block #8 (SIB8) that includes data that a recipient WCD may programmatically interpret to mean that the LTE coverage area in which the overhead signal is broadcast is one that supports CSFB functionality. The WCD may then detect this broadcast signal and responsively register in coverage area 18 with the LTE network. Under LTE principles, the WCD may do so by transmitting an attach request to the eNodeB 36, including in the attach request data that indicates capabilities of the WCD and particularly an indication that the WCD supports CSFB functionality.

Upon receipt of this attach request, the LTE network may register presence of the WCD in coverage area 18 of eNodeB 36. For instance, eNodeB 36 may signal to MME 38 to trigger this registration. Further, in response to the attach request indicting that the WCD supports CSFB functionality, MME 38 may also signal to IWS 32 to trigger registration of the WCD with the CDMA network 14. In particular upon receipt of the signal from MME 38, IWS 32 may signal to MSC 48, and the MSC (in cooperation with a home location register and/or other network infrastructure) may register the fact that the WCD is currently served by the LTE network 12. The LTE network may serve the WCD. For instance, the LTE network may assign at least one resource to the WCD (e.g., a bearer) and may use that at least one resource to serve the WCD.

When the MSC 48 receives a request to connect a call to the WCD, the MSC may then send to the IWS 32 a page request, and the IWS may in turn signal to the MME 38. The MME may then signal to the eNodeB to trigger paging of the WCD over the LTE air interface. The eNodeB may then transmit a CSFB page to the WCD, to which the WCD may respond, and the WCD may transmit to the eNodeB a CSFB extended service request message, which the eNodeB may forward to the MME. And likewise, if the WCD seeks to originate a CSFB call, the WCD may establish connectivity with the eNodeB if necessary and may then send a CSFB extended service request message to the eNodeB, which the eNodeB may similarly forward to the MME. After the WCD transitions to the network 14, the WCD may then complete setup of the CSFB call so as to engage in the communication.

In accordance with the disclosure, LTE network 12 may be configured to serve a UE such as WCD 34. CDMA network may also be configured to serve a UE such as WCD 34. Further, LTE network 12 may have a set of access resources usable by UEs to request access to the LTE network, and this set of access resources may include both contention-free access resources and non-contention-free access resources. For each contention-free access resource, LTE network 12 may limit assignment of the contention-free access resource to a single UE at a time, so as to allow the single UE contention-free use of the contention-free access resource when the contention-free access resource is assigned to the single UE.

3. Example Network Element Components

Figure 3:
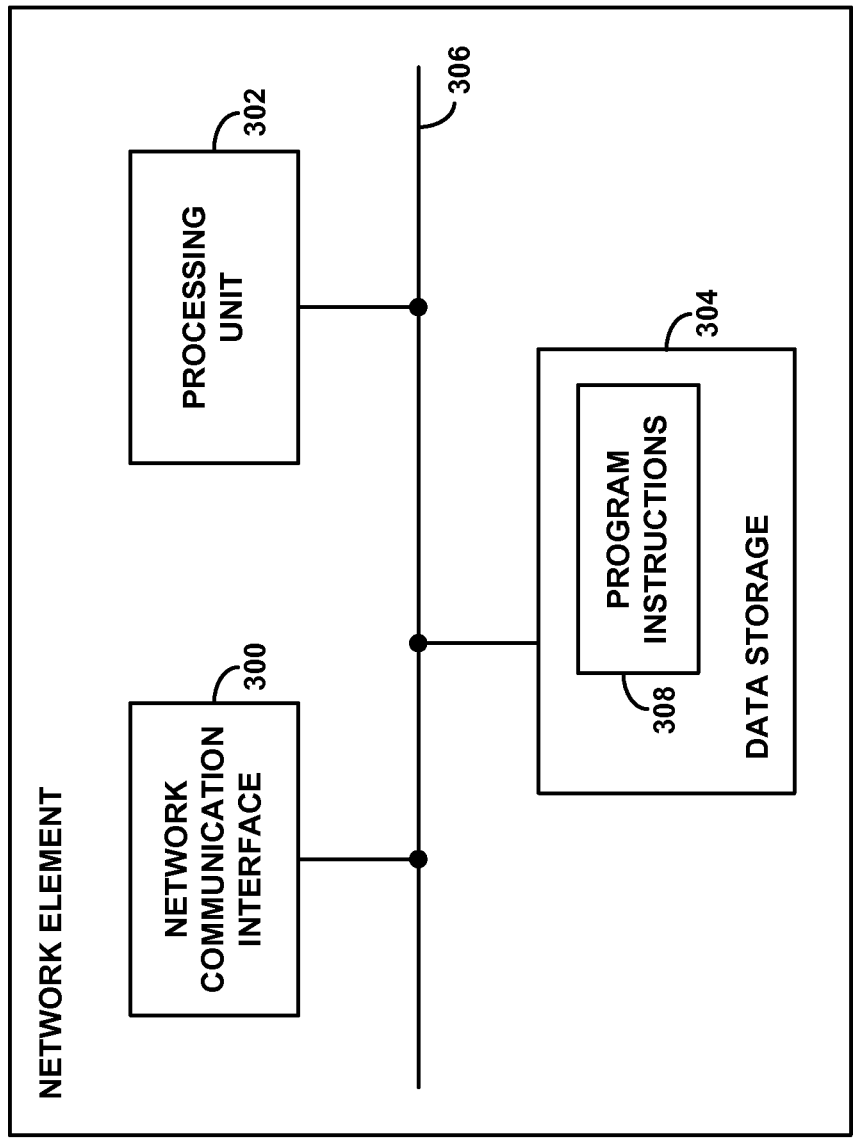
FIG. 3 is a simplified block diagram of a network element operable in a network arrangement such as that depicted in FIGS. 1 and 2.

FIG. 3 is next a simplified block diagram of a network element showing some of the physical components that such an element may include. Network elements may also be referred to herein as network nodes. This block diagram may represent any of a variety of the network elements shown in FIGS. 1 and 2 for instance.

As shown in FIG. 3, the network element includes a network communication interface 300, a processing unit 302, and data storage 304, all of which may be communicatively linked together by a system bus, network, or other connection mechanism 306. Although the figure shows these components as discrete blocks, it should be understood that the components can be integrated together or distributed in various ways, and one or more components could be omitted altogether.

With this arrangement, the network communication interface 300 may function to provide for communication with various other network elements and may thus take various forms, allowing for wired and/or wireless communication for instance. Processing unit 302 may then comprise one or more general purpose processors (e.g., microprocessors) and/or one or more special purpose processors (e.g., application specific integrated circuits) and may be integrated in whole or in part with the network communication interface. And data storage 304 may comprise one or more volatile and/or non-volatile storage components, such as optical, magnetic, or flash memory and may be integrated in whole or in part with the processing unit. As shown, by way of example, data storage 304 may then comprise program instructions 308, which may be executable by processing unit 302 to carry out various functions described herein.

In an exemplary embodiment, data storage 304 may include program instructions that are executable to cause a first wireless network (e.g., LTE network 12) or at least one component of the first wireless network to perform functions comprising: (i) detecting an attempt to set up a CSFB call between (a) a UE served by the first network and (b) a remote party, wherein the CSFB call is to be served by a second network (e.g., CDMA network 14) to which the UE would transition to be served with the CSFB call; and (ii) in response to detecting the attempt to set up the CSFB call, assigning one of the contention-free access resources to the UE, so as to allow a contention-free access request by the UE to the first network.

4. Example User Equipment Device (UE)

Figure 4:
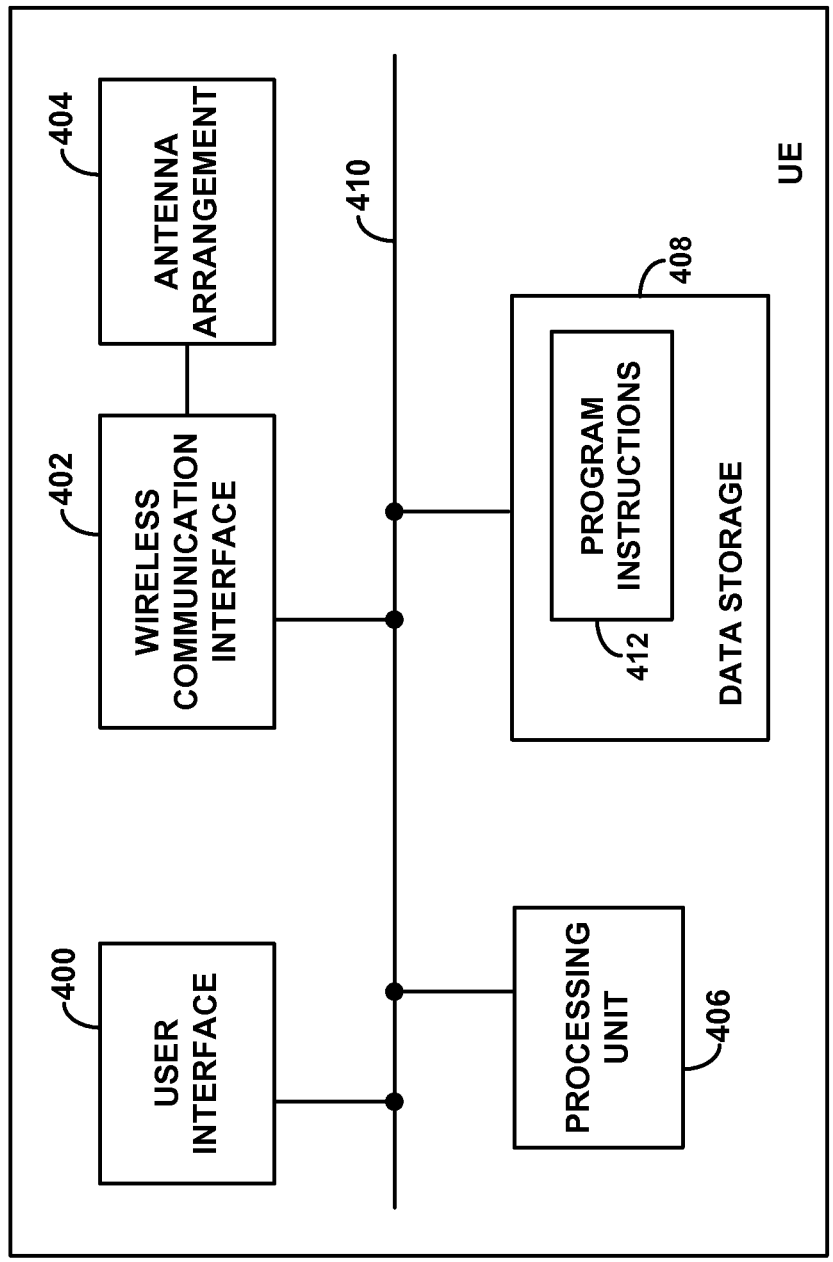
FIG. 4 is a simplified block diagram of a user equipment device (UE) operable in a network arrangement such as that depicted in FIGS. 1 and 2.

FIG. 4 is a simplified block diagram of a UE, showing some of the components that such a device may include to facilitate implementation of the present method. As shown in FIG. 4, the UE includes a user interface 400, a wireless communication interface 402 with an antenna arrangement 404, a processing unit 406, and data storage 408, all of which may be communicatively linked together by a system bus, network, or other connection mechanism 410. Although the figure shows these components as discrete blocks, it should be understood that the components can be integrated together or distributed in various ways, and one or more components could be omitted altogether.

User interface 400 (if applicable for the UE at issue) includes components for receiving input from a user of the UE and providing output to a user of the UE. Wireless communication interface 402 with antenna arrangement 404 functions to facilitate air interface communication with the wireless network according to one or more protocols such as those noted above.

Processing unit 406 may then comprise one or more general purpose processors (e.g., microprocessors) and/or one or more special purpose processors (e.g., application specific integrated circuits) and may be integrated in whole or in part with the network communication interface. And data storage 408 may comprise one or more volatile and/or non-volatile storage components, such as optical, magnetic, or flash memory and may be integrated in whole or in part with the processing unit. As shown, by way of example, data storage 408 may then comprise program instructions 412, which may be executable by processing unit 406 to carry out various functions described herein.

In an example arrangement, data storage 408 may include program instructions that are executable to cause the UE to perform functions comprising: (i) engaging in CSFB call-setup signaling with a second network (e.g., CDMA network 14), via a first network (e.g., LTE network 12), to set up a CSFB call; (ii) transitioning from being served by the first network to being served by the second network, so as to continue to set up the CSFB call; (iii) before completing setup of the CSFB call, (a) receiving an assignment of one of the contention-free access resources from the first network and (b) receiving a user command to reject the CSFB call; and (iv) in response to receiving the user command to reject the CSFB call, (a) rejecting the CSFB call and (b) sending to the first network an access request that uses the assigned contention-free access resource, so as to transition back to being served by the first network.

5. Example Operation i. A First Example Method

Figure 5:
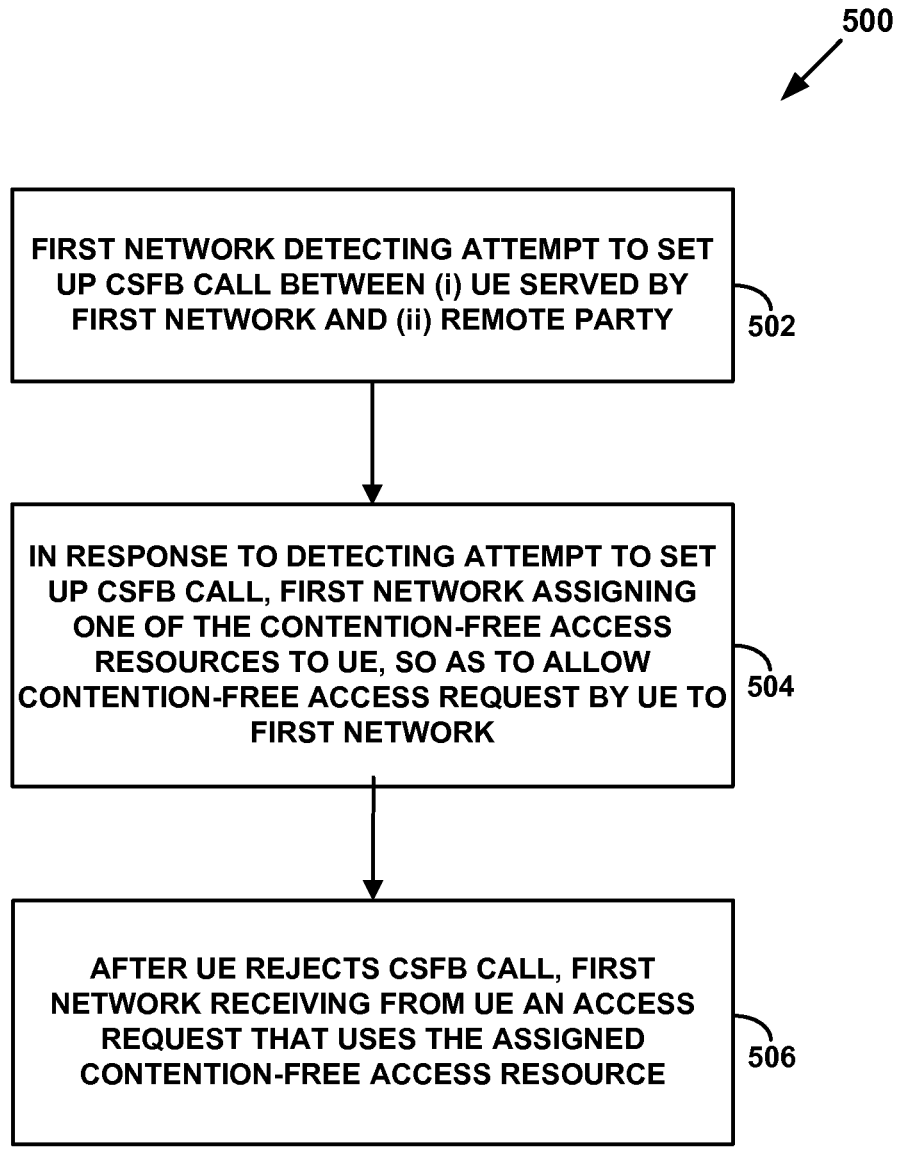
FIG. 5 is a flow chart depicting functions that can be carried out in accordance with an example method.

FIG. 5 is next a flow chart depicting a method 500 that can be carried out in accordance with the present disclosure, in an arrangement such as that depicted in FIG. 1 or more specifically in FIG. 2 for instance, and that can thus be implemented by one or more of the illustrated network elements as discussed above.

As a preliminary matter, a first network may be configured to serve UEs according to a first air interface protocol and a second network may be configured to serve UEs according to a second air interface protocol. Further, the first network may have a set of access resources usable by UEs to request access to the first network, and this set of access resources may include both contention-free access resources and non-contention-free access resources. As shown in FIG. 5, at block 502, the method involves, the first network detecting an attempt to set up a CSFB call between (i) a UE served by the first network and (ii) a remote party, where the CSFB call is to be served by a second network to which the UE would transition to be served with the CSFB call. The method further involves, at block 504, in response to detecting the attempt to set up the CSFB call, the first network assigning one of the contention-free access resources to the UE, so as to allow a contention-free access request by the UE to the first network. In an example, the method may also involve, at block 506, the first network receiving from the UE an access request that uses the assigned contention-free access resource.

In an example embodiment, these functions of method 500 could be carried out by a first wireless network such as LTE network 12 illustrated in FIG. 2. Further, the second network may be a second network such as CDMA network 14, and the UE may be a WCD such as WCD 34. Still further, the method 500 may be carried out by a component or a combination of components of the first wireless network 12. For example, the method may be carried out by a first wireless network node such as eNodeB 36 or MME 38, or the method may be carried out by a combination of network elements such as eNodeB 36 and MME 38. Other examples are possible as well.

The set of access resources usable by UEs to request access to LTE network 12 may include any suitable access resources. For example, LTE network 12 may have a particular set of access resources, such as a particular number of access codes such as access preambles, a particular number of access timeslots per cycle, and/or a particular number of access channels. Each of these access resources may be used by UEs in one way or another to access the first network. Other example access resources are possible as well.

In accordance with the disclosure, LTE network 12 may reserve a particular number or particular percentage of these access resources for contention-free use. Therefore, of these access resources usable by UEs to request access to LTE network 12, some of the access resources may be contention-free access resources while other access resources may be non-contention-free access resources. For instance, as mentioned above, under LTE there are typically 64 preamble signatures available. According to an example embodiment, LTE network 12 may reserve some of these access preambles for contention-free use so as to have a small set of contention-free preambles. For example, LTE network 12 may reserve 10 of these 64 preamble signatures for contention-free use, and the remaining 54 preamble signatures may be non-contention-free access resources.

For each contention-free access resource, LTE network 12 may limit assignment of the contention-free access resource to a single UE at a time, so as to allow the single UE contention-free use of the contention-free access resource when the contention-free access resource is assigned to the single UE. On the other hand, for each non-contention-free access resource, LTE network 12 would not limit assignment of the non-contention-free access resource to a single UE at a time. Rather, LTE network 12 would allow multiple UEs to attempt to use the non-contention-free access resource at a given time.

Since LTE network 12 may limit assignment of each contention-free access resource to a single UE at a time, the contention-free access resources may be resources that can be used by UEs without encountering access-resource contention or collision. On the other hand, the non-contention-free access resources may be access resources that could encounter access-resource contention or collision (e.g., contention or collision due to the non-contention-free access resource being used by more than one UE at a given time).

Returning to FIG. 5, at block 502, LTE network 12 may detect an attempt to set up a CSFB call between UE 34 and a remote party such as WCD 52. In an example, WCD 52 may originate a call to UE 34, and thus LTE network 12 may detect the attempt to set up the CSFB call in response to WCD 52 originating a call to UE 34. In another example, UE 34 may originate the CSFB call, and thus LTE network 12 may detect the attempt to set up the CSFB call in response to UE 34 originating a call to WCD 52. Various network entities may detect the attempt to set up the CSFB call. For instance, MME 38 or eNodeB 36 may detect the attempt to set up the CSFB call.

At block 504, in response to detecting the attempt to set up the CSFB call, LTE network 12 may assign one of the contention-free access resources to UE 34. For example, LTE network 12 may assign a contention-free access preamble, contention-free access timeslot, and/or a contention-free access channel to UE 34. Continuing the example above where 10 access preambles of the 64 access preambles are reserved as contention-free access preambles, LTE network 12 may assign to UE 34 one of the 10 contention-free access preambles.

The act of assigning the contention-free access resource to UE 34 may take various forms. For example, LTE network 12 may send UE 34 a message that includes an indication of the assigned contention-free access resource. For instance, LTE network 12 may send an access-resource assignment message to UE 34. In another example, LTE network 12 may assign the contention-free access resource to the UE in a CSFB-setup message. For instance, LTE network 12 may send a handover message to UE 34 so as to invoke setup of the CSFB call. Assigning one of the contention-free access resources to UE 34 may involve assigning one of the contention-free access resources to the UE in the handover message sent to the UE. Other examples are possible as well.

After LTE network 12 detects the attempt to set up a CSFB call between UE 34 and WCD 52, the LTE network may signal to invoke set up of the CSFB call (e.g., a standard CSFB call or an eCSFB call) between UE 34 and WCD 52 via second network 14. LTE network 12 may use various network components in order to signal to invoke set up of a CSFB call between UE 34 and WCD 52 via CDMA network 14. For instance, the signaling to invoke setup of the CSFB call between UE 34 and WCD 52 via CDMA network 14 may include signaling that results in MME 38 invoking setup of the CSFB call. In an example, MME 38 invoking setup of the CSFB call includes signaling from the MME to switch 48 via the IWS 32 to cause the switch to (i) page UE 34 to cause the UE to transition to be served by CDMA network 14 and (ii) connect the CSFB call between the UE and WCD 52.

In response to the signaling to invoke setup of the CSFB call, UE 34 may transition from being served by LTE network 12 to being served by CDMA network 14. After transitioning to being served by CDMA network 14, UE 34 and the CDMA network may signal in order to complete setup of the CSFB call. On the other hand, the user of UE 34 may cancel or reject the CSFB call, and thus the UE may not complete setup of the CSFB call.

After the user of UE 34 cancels or rejects the CSFB call (or the UE otherwise fails to complete setup of the CSFB call), the UE may attempt to return to LTE network 12. In doing so, UE 34 may use the assigned contention-free access resource for a contention-free access request by the UE to LTE network 12. At block 506, LTE network 12 may then receive from UE 34 the access request that uses the assigned contention-free access resource. LTE network 12 may then process the access request and reconnect UE 34 to the first network. Beneficially, by being assigned a contention-free access resource, the UE may send a contention-free access request to the LTE network, which may help the UE quickly return to the LTE network without the risk of access-resource contention or collision. By returning to the LTE network without the risk of access-resource contention or collision, the UE may be able to return to the LTE network more quickly than it otherwise would have if there was a risk of access-resource contention or collision. Therefore, in the event that the UE does not complete call setup and transitions back to the LTE network, the disclosed method may decrease the time it takes for the UE to reconnect to the LTE network in order to once again be served by the LTE network.

In an example, LTE network 12 may limit the period of time for which the LTE network assigns the contention-free access resource to UE 34. In other words, assigning one of the contention-free access resources to UE 34 may involve assigning one of the contention-free access resources to the UE for a predetermined period of time. After expiration of the predetermined period of time, LTE network 12 may release assignment of the assigned contention-free access resource, so as to make the contention-free access resource available to assign to another UE. For example, after expiration of the predetermined period of time, LTE network 12 may treat the assigned contention-free access resource as no longer usable by UE 34, and LTE network 12 may then be free to assign the contention-free access resource to another UE such as UE 54. Similarly, after expiration of the predetermined period of time, the assigned contention-free access resource may be unusable by the UE. In this case, when the UE attempts to access the LTE network, the UE could use a non-contention-free access resource to access the LTE network.

This predetermined period of time may be less than a threshold period of time, and this threshold period of time could be any suitable threshold period time. For example, the threshold period of time may be 20 seconds. This example threshold value beneficially provides sufficient time for the UE to return back to the LTE network in the event that the UE rejects or cancels the CSFB call. Other example thresholds are possible as well, such as a threshold greater than or less than 20 seconds.

Further, the threshold could be static threshold value or a dynamic threshold value. For instance, LTE 12 network may apply a static threshold value such as 20 seconds. In another example, LTE network 12 could adjust the threshold value based on various network conditions. For instance, the threshold period of time could be a dynamic threshold value that varies within a suitable range such as between five seconds to one minute. Other ranges are possible as well. In an example, the dynamic threshold value could vary based on the availability of contention-free access resources. For instance, the dynamic threshold value may be dependent on the number of contention-free access resources available for assignment to UEs. As an example, LTE network 12 may utilize a higher threshold value when more contention-free access resources are available for assignment. As a particular example, LTE network 12 may utilize a higher threshold value (e.g., 45 seconds) when over 75% of the contention-free access resources are available for assignment and a lower threshold value (e.g., 15 seconds) when less than 25% of the contention-free access resources are available for assignment. Other examples are possible as well.

Alternatively, rather than releasing the assignment of the assigned contention-free access resource after expiration of the predetermined period of time, LTE network 12 may release assignment of the assigned contention-free access resource in response to UE 34 completing setup of the CSFB call. For example, after UE 34 has transitioned from being served by LTE network 12 to being served by CDMA network 14, the LTE network may receive a notification message indicating that setup of the CSFB call between UE 34 and WCD 52 is complete. In response to receiving the notification message, LTE network 12 may release the assignment of the assigned contention-free access resource. By releasing the assignment of the assigned contention-free access resource, LTE network 12 may assign that released contention-free access resource to another UE operating under the coverage of the LTE network such as WCD 54.

The act of receiving the notification may take various forms. For example, MME 38 may receive the notification message from MSC 48 via IWS 32. In another example, eNodeB 36 may receive the notification message. Other examples are possible as well.

As noted above, LTE network 12 may have a limited number of contention-free access resources available. Since LTE network 12 may only have a limited number of contention-free access resources available, it may be possible that at a given time, the LTE network may not have any available contention-free access resources to assign to UEs. Further, in some situations, a contention-free access request may be more useful for one UE than for another UE. For example, a user of a UE engaged in video streaming may have a greater desire to return to the LTE network than would a user of a UE that is merely idling in the LTE network. This user may have a greater desire to return for a variety of reasons, such as the fact that a disruption of LTE service may be more noticeable to the user of a UE engaged in video streaming than to the user of a UE that is idling in the LTE network.

Therefore, in addition to assigning a contention-free access resource to a UE in response to detecting the attempt to setup the CSFB call, the disclosed method may further involve conditioning the assignment of a contention-free access resource on various other factors. For example, the disclosed method may further involve conditioning the assignment of a contention-free access resource on whether the UE was engaged in a service having an associated quality-of-service level that is above a threshold level.

In accordance with an example embodiment, before detecting the attempt to set up the CSFB call, LTE network 12 may be serving UE 34 by providing service having an associated quality-of-service level. This associated quality-of-service level may be a desired data rate of transfer such as a data rate between 5 kbps and 30 kbps. Other example quality-of-service levels are possible as well. The disclosed method may further involve determining that the quality-of-service level is above a predefined threshold quality-of-service level, and assigning one of the contention-free access resources to the UE may be further responsive to determining that the quality-of-service level is above the predefined threshold quality-of-service level. The predefined threshold quality-of-service level may be any suitable threshold such as 10 kbps. Other example threshold levels are possible as well. For the reasons discussed above, it may be beneficial to assign the contention-free access resources to a UE engaged in a service having a higher associated quality-of-service level than to a UE engaged in a service having a lower associated quality-of-service level.

Further, in an example, this predefined threshold quality-of-service level may be a static threshold level. In another example, this predefined threshold quality-of-service level may be a dynamic threshold quality-of-service level. For instance, LTE network 12 may utilize a higher threshold level when fewer contention-free access resources are available for assignment. As a particular example, LTE network 12 may utilize a lower threshold level (e.g., 10 kbps) when over 75% of the contention-free access resources are available for assignment and a higher threshold value (e.g., 20 kbps) when less than 25% of the contention-free access resources are available for assignment. Other examples are possible as well.

ii. A Second Example Method

Figure 6:
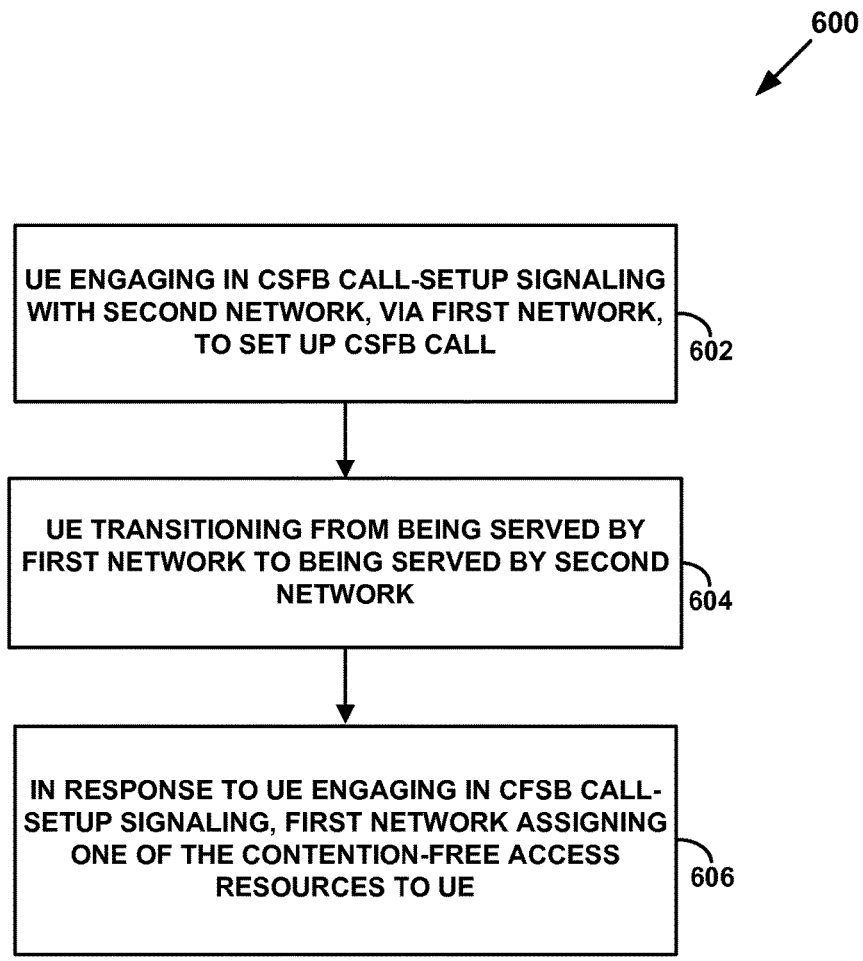
FIG. 6 is another flow chart depicting functions that can be carried out in accordance with an example method.

FIG. 6 is next another flow chart depicting a method 600 that can be carried out with a network arrangement such as that shown in FIG. 2 for instance. For example, method 600 may be carried out by LTE network 12 in combination with UE 34. Furthermore, method 600 is similar in some respects to the method 500, and thus is not described in as great of detail. It should be explicitly noted, however, that any possibilities and permutations described above with respect to method 500 may equally apply to method 600, and vice versa.

As shown in FIG. 6, method 600 involves, at block 602, a UE engaging in CSFB call-setup signaling with the second network, via the first network, to set up a CSFB call. The method then involves, at block 604, the UE transitioning to be served by the second network so as to either accept the CSFB call or reject the CSFB call. The method then involves, at block 606, in response to the UE engaging in the CFSB call-setup signaling, the first network assigning one of the contention-free access resources to the UE, so as to allow the UE to readily re-access the first network in the event the UE rejects the CSFB call. The method may further involve the UE rejecting the CSFB call and, in response to the UE rejecting the CSFB call, the UE sending to the first network an access request that uses the assigned contention-free access resource.

iii. A Third Example Method

Figure 7:
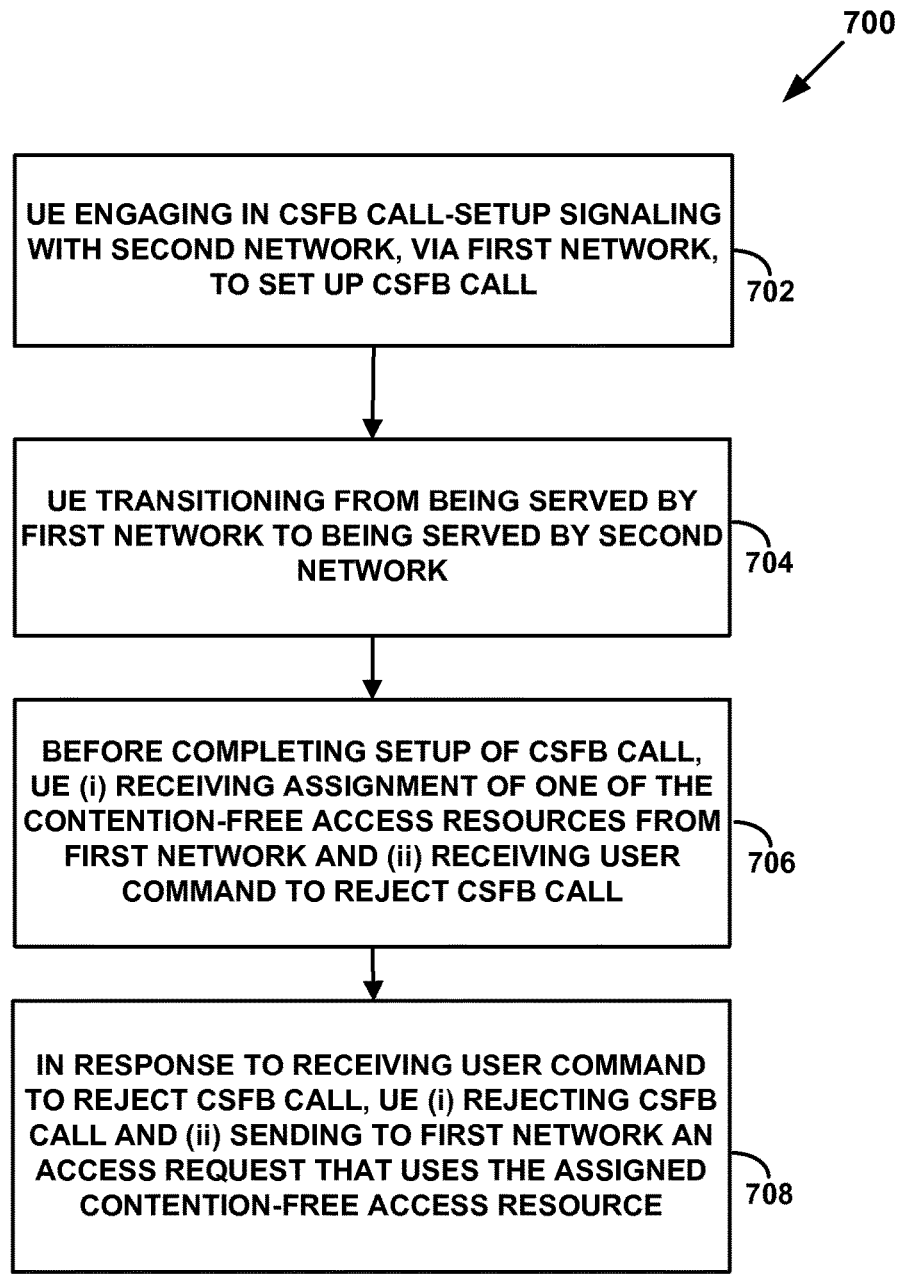
FIG. 7 is yet another flow chart depicting functions that can be carried out in accordance with an example method.

FIG. 7 is next another flow chart depicting a method 700 that can be carried out by a UE such as UE 34 in a network arrangement such as that shown in FIG. 2 for instance. Furthermore, method 700 is similar in some respects to the method 500, and thus is not described in as great of detail. It should be explicitly noted, however, that any possibilities and permutations described above with respect to method 500 may equally apply to method 700, and vice versa.

Method 700 may involve, at block 702, a UE engaging in circuit-switched-fallback (CSFB) call-setup signaling with the second network, via the first network, to set up a CSFB call. Method 700 may then involve, at block 704, the UE transitioning from being served by the first network to being served by the second network, so as to continue to set up the CSFB call. Method 700 may also involve, at block 706, before completing setup of the CSFB call, the UE (i) receiving an assignment of one of the contention-free access resources from the first network and (ii) receiving a user command to reject the CSFB call. Further, method 700 may involve, at block 708, in response to receiving the user command to reject the CSFB call, the UE (i) rejecting the CSFB call and (ii) sending to the first network an access request that uses the assigned contention-free access resource, so as to transition back to being served by the first network.

As discussed above, during setup of a CSFB call, a UE such as UE 34 may transition from being served by a first network such as LTE network 12 to being served by a second network such as CDMA network, so as to continue to set up the CSFB call. In an example, UE 34 may receive the assignment of one of the contention-free access resources from the first network before transitioning from being served by LTE network 12 to being served by CDMA network 14.

Further, UE 34 may receive a user command to reject the CSFB call after transitioning from being served by LTE network 12 to being served by CDMA network 14. In addition, receiving a user command to reject the CSFB call may involve receiving the user command in response to a user rejecting the CSFB call or the use canceling the CSFB call. For instance, UE 34 may receive caller-ID information when the UE is actually within coverage of CDMA network 14, and the user may elect to reject the CSFB call after seeing the caller-ID information.

6. Example Benefit of the Disclosed Method and System

The proposed method and system beneficially provides an improved way to handle the assignment of an access resource to a UE in a fallback scenario. As described above, in practice, there is a chance that the UE user may reject a CSFB call once the UE is in coverage of the second network. Further, in such a situation, it may be beneficial for the UE to quickly return to the first network in order to continue to be served by the first network. However, access to the first network may be delayed due to access-resource contention issues that may result from a UE using a non-contention-free access resource.

Beneficially, the disclosed method and system overcomes example problems associated with a fallback situation where a UE transitions from being served by the first network to being served by the second network but then rejects the CSFB call and returns to the first network. For example, by assigning the contention-free access resource, the first network may beneficially allow a contention-free access request by the UE to the first network in the event that the UE cancels or rejects the CSFB call. This contention-free access request may allow the UE to quickly return to the first network, so as to continue with service under the LTE network. By assigning a contention-free access resource, the LTE network may eliminate or minimize issues resulting from access-resource contention.

Further, by providing this improved way to handle the assignment of an access resource to a UE in a fallback scenario, the disclosed method and system may in turn improve service quality for UEs operating in a wireless network. Therefore, the disclosed method and system can help to improve service quality overall for users, thus increasing user satisfaction with wireless performance.

7. Conclusion

Exemplary embodiments have been described above. Those skilled in the art will understand, however, that changes and modifications may be made to these embodiments without departing from the true scope and spirit of the invention.

We claim:

1. A method in a communication system, wherein the communication system comprises a first network configured to serve user equipment devices (UEs) according to a first air interface protocol and a second network configured to serve UEs according to a second air interface protocol, wherein the first network has a set of access resources usable by UEs to request access to the first network, wherein the set of access resources comprises contention-free access resources and non-contention-free access resources, wherein, for each contention-free access resource, the first network limits assignment of the contention-free access resource to a single UE at a time, so as to allow the single UE contention-free use of the contention-free access resource when the contention-free access resource is assigned to the single UE, the method comprising:
 a UE engaging in circuit-switched-fallback (CSFB) call-setup signaling with the second network, via the first network, to set up a CSFB call;
 the UE transitioning from being served by first network to being served by the second network so as to either accept the CSFB call or reject the CSFB call; and
 in response to the UE engaging in the CFSB call-setup signaling, the first network assigning one of the contention-free access resources to the UE, so as to allow the UE to readily re-access the first network in the event the UE rejects the CSFB call.

2. The method of claim 1, further comprising:
 the UE rejecting the CSFB call; and
 in response to the UE rejecting the CSFB call, the UE sending to the first network an access request that uses the assigned contention-free access resource.

3. The method of claim 1, wherein assigning one of the contention-free access resources to the UE comprises assigning one of the contention-free access resources to the UE for a predetermined period of time.

4. The method of claim 3, wherein after expiration of the predetermined period of time, the assigned contention-free access resource is unusable by the UE.

5. The method of claim 1, wherein the assigned contention-free access resource comprises a contention-free access resource selected from the group consisting of an access preamble, an access timeslot, and an access channel.

6. The method of claim 1, wherein the first network is a Long Term Evolution (LTE) network, and wherein the second network is selected from the group consisting of a Code Division Multiple Access (CDMA) network and a Global System for Mobile Communications (GSM) network.

7. A method in a communication system, wherein the communication system comprises a first network configured to serve user equipment devices (UEs) according to a first air interface protocol and a second network configured to serve UEs according to a second air interface protocol, wherein the first network has a set of access resources for serving UEs accessing the first network, wherein the set of access resources comprises contention-free access resources and non-contention-free access resources, the method comprising:
 a UE engaging in circuit-switched-fallback (CSFB) call-setup signaling with the second network, via the first network, to set up a CSFB call;
 the UE transitioning from being served by the first network to being served by the second network, so as to continue to set up the CSFB call;
 before completing setup of the CSFB call, the UE (i) receiving an assignment of one of the contention-free access resources from the first network and (ii) receiving a user command to reject the CSFB call; and
 in response to receiving the user command to reject the CSFB call, the UE (i) rejecting the CSFB call and (ii) sending to the first network an access request that uses the assigned contention-free access resource, so as to transition back to being served by the first network.

8. The method of claim 7, wherein the UE receiving an assignment of one of the contention-free access resources from the first network comprises receiving the assignment before transitioning from being served by the first network to being served by the second network.

9. The method of claim 7, wherein the assigned contention-free access resource comprises a contention-free access resource selected from the group consisting of an access preamble, an access timeslot, and an access channel.

10. The method of claim 7, wherein the first network is a Long Term Evolution (LTE) network, and wherein the second network is selected from the group consisting of a Code Division Multiple Access (CDMA) network and a Global System for Mobile Communications (GSM) network.

* * * * *